Patented Jan. 2, 1923.

1,441,072

UNITED STATES PATENT OFFICE.

FRANK EDWARD ELMORE, OF BOXMOOR, ENGLAND.

TREATMENT OF LEAD-ZINC ORE.

No Drawing. Application filed September 17, 1917. Serial No. 191,850.

*To all whom it may concern:*

Be it known that I, FRANK EDWARD ELMORE, a subject of the King of Great Britain, residing in Boxmoor, England, have invented a certain new and useful Treatment of Lead-Zinc Ores, of which the following is a specification.

This invention relates to the extraction and separation of lead and zinc from ores, concentrates and the like in which these metals exist associated together in the form of sulphides.

Large quantities of such ores are obtainable, but in certain cases considerable difficulties are experienced in the commercial extraction and separation of the metals by hitherto known methods.

The object of the present invention is to provide a practical and efficient method of treating such ores, concentrates and the like so as to effect a substantial separation of the two metals.

The process is based upon the difference in the behaviour of the two sulphides towards sulphuric acid (which term includes, and is used in the claims hereto annexed to cover, sulphuric acid alone and sulphuric acid to which sodium chloride, ammonium chloride, potassium chloride or a corresponding bromide or potassium or sodium bisulphate has been added), by reason of which the lead sulphide is converted into a soluble compound whilst the zinc sulphide remains insoluble. For example, if finely ground galena (native sulphide of lead) be heated at about 100° C. with concentrated sulphuric acid (specific gravity about 1.84), the sulphide of lead is converted into sulphate. With proper adjustment of conditions, such as fineness of grinding, proportion of sulphuric acid, temperature and time of contact, substantially the whole of the sulphide can be converted into sulphate. The latter compound may then be dissolved, for instance, in a hot saturated solution of sodium chloride and thus separated from any insoluble matter. On the other hand, if zinc blende (native sulphide of zinc) be heated with the concentrated acid at a temperature of about 100° C., only a relatively small amount of the zinc is converted into sulphate, the major portion remaining insoluble in hot brine. If, therefore, the two sulphides be present in an ore or concentrate the lead and zinc may be separated in this manner.

According to one form of the invention the finely ground ore containing the sulphides of lead and zinc is heated with a sufficient quantity of concentrated sulphuric acid at a temperature of about 100° C., until substantially the whole of the lead has been converted into sulphate. The product is washed once or twice with water to remove practically the whole of any remaining free acid and to the residue is added a hot, strong, preferably saturated solution of sodium chloride. The sulphate of lead dissolves readily in the hot brine and may be separated by filtration, decantation or otherwise from the undissolved matter containing the zinc sulphide. The hot brine is then cooled, whereupon any excess of lead salt over that which the cooled brine can hold in solution will be precipitated and can be collected for use in any known manner, whilst the brine is re-heated to be used over again. The brine may thus remain in circulation in the process.

*Example 1.*—A lead-zinc sulphide ore from Burmah containing 23.0 per cent of lead and 40.5 per cent of zinc is ground to pass a 60 mesh standard sieve. Twenty kilos of the powder are mixed with twenty litres of sulphuric acid of 1.84 specific gravity in a lead-lined, steam-heated vessel and the mixture is heated at about 100° C. until the evolution of sulphur dioxide has practically ceased. Water is now run into the vessel, the mixture well stirred and allowed to settle; the water is run off and this washing operation once repeated. One hundred litres of a saturated solution of common salt are now run into the vessel, the contents of which are well stirred and maintained at 100° C. for, say, half an hour, whereupon the undissolved matter is allowed to settle and the hot solution run into a cooling vat in which a mixture of lead sulphate and chloride separates from the liquid and may be collected for metallurgical treatment. The residue in the heating vessel may be washed first with brine and then with water, if desired, and metallurgically treated for recovery of zinc.

If, instead of sulphuric acid of 1.84 specific gravity, a less concentrated acid be employed, the lead can be converted into lead sulphate, but a larger proportion of the zinc may be in this case converted into zinc sulphate. In deciding whether to use concentrated or weaker acid, practical considerations such as the value of zinc and the cost of the different grades of acid must be taken into account. On using concentrated acid or somewhat weaker acid, the reaction upon the lead sulphide is accompanied by an evolution of sulphur dioxide and the production of free sulphur. With still weaker acids, however, the reaction is accompanied mainly by the evolution of sulphuretted hydrogen. In whatever form sulphur is liberated it may be used in known manner for producing sulphuric acid. By working separate batches with strong and weaker acids respectively, it is possible, as an alternative to using the sulphur dioxide and sulphuretted hydrogen directly in the known manner for the production of sulphur or sulphuric acid, to lead the sulphur dioxide liberated from the strong-acid batch into the weak-acid batch, whereby the objectionable emission of both sulphur dioxide and sulphuretted hydrogen may be largely abated.

It is sometimes useful to treat the ore with an acid in presence of a salt, such as sodium chloride. A weaker acid may then be used. Thus, the finely subdivided ore may be treated with hot, strong brine to which sulphuric acid has been added.

*Example 2.*—Twenty kilos of the ore referred to in Example 1, crushed to pass through a 100 mesh standard sieve, are stirred in an earthenware steam-heated vessel with one hundred litres of a saturated solution of common salt and the mixture is heated to about 85° C. Six litres of sulphuric acid of 1.84 specific gravity are gradually run into the vessel, the heating being continued. The lead sulphide is attacked, the lead passing into solution, while the zinc sulphide remains substantially undissolved. When the evolution of sulphuretted hydrogen has practically ceased, the hot brine is separated from the insoluble matter and is run into a cooling vat, where it deposits lead salt; it may be re-heated to be used again.

The lead sulphate, may be mixed with lead sulphite and smelted in known manner, and the lead sulphide, or a part of it, necessary for the purpose may be made by utilizing the sulphretted hydrogen from the treatment of the ore with a comparatively weak acid as aforesaid.

It is obvious that for economy in working, the liquor containing the lead salt or salts may be cooled in a heat interchanger in which another portion of the solvent is heated for re-use in the process.

The solution containing the extracted lead compound may be treated at any suitable stage of the process for recovery or removal of any valuable or deleterious matter which it may contain.

In the foregoing examples the proportions named are merely illustrative. The best proportions to use will depend to some extent on the grade and kind of ore treated and on local conditions.

In some instances it is advisable to treat the material by a preliminary concentration process with the object of reducing the proportion of acid consuming material present and of reducing the bulk to be treated by removal of inert waste.

Having thus described the nature of the said invention and the best means I know of carrying the same into practical effect, I claim:—

1. The treatment of lead-zinc sulphide ores, concentrates and the like consisting in heating the ore with sulphuric acid which converts the lead sulphide into a lead compound soluble in a substance which will not dissolve zinc sulphide and then extracting the said lead compound by means of a solvent thereof from the residual zinc sulphide.

2. The treatment of lead-zinc sulphide ores, concentrates and the like consisting in heating the ore with sulphuric acid which converts the lead sulphide into a lead compound soluble in a substance which will not dissolve zinc sulphide, then dissolving the said lead compound by a hot solvent thereof which will not dissolve zinc sulphide, separating the hot solution from the undissolved matter, cooling the solution, separating the deposited lead compound and heating the liquid again for re-use.

3. The treatment of lead-zinc sulphide ores, concentrates and the like consisting in heating the ore with sulphuric acid which converts the lead sulphide into a lead compound soluble in a substance which will not dissolve zinc sulphide, then dissolving the said lead compound by hot strong brine, separating the hot solution from the undissolved matter, cooling the solution, separating the deposited lead compound and heating the liquid again for re-use.

4. The treatment of lead-zinc sulphide ores, concentrates and the like consisting in heating the ore with strong sulphuric acid at about 100° C. until substantially all the lead sulphide has been converted into lead sulphate, dissolving the latter with hot strong brine, separating the hot solution from the unattacked zinc sulphide, cooling the solution to cause a partial crystallization of lead salt, and heating the brine again for re-use.

5. The treatment of lead-zinc sulphide ores, concentrates and the like, consisting in heating the ore with sulphuric acid which causes evolution of sulphuretted hydrogen from the ore and converts the lead sulphide into a compound soluble in a substance which will not dissolve zinc sulphide, utilizing the sulphuretted hydrogen to make lead sulphide from the soluble lead compound and smelting the lead sulphide together with lead sulphate so as to produce metallic lead.

In testimony whereof I have signed my name to this specification in the presence of two subscribing witnesses.

FRANK EDWARD ELMORE.

Witnesses:
T. J. OSMAN,
WALTER J. WERBEN.